US007082504B2

(12) United States Patent
Rojas et al.

(10) Patent No.: US 7,082,504 B2
(45) Date of Patent: Jul. 25, 2006

(54) METHOD AND APPARATUS FOR ASYNCHRONOUS READ CONTROL

(76) Inventors: Edmundo Rojas, 1226 Basseterre Pl., Fort Collins, CO (US) 80525; Hui-Sian Ong, 1 Yishun Avenue 7 3rd Floor, West Wing (SG) 768923; Robert H Miller, Jr., 431 W. 5th St., Loveland, CO (US) 80537

( * ) Notice: Subject to any disclaimer, the term of this patent is extended or adjusted under 35 U.S.C. 154(b) by 461 days.

(21) Appl. No.: 10/199,184

(22) Filed: Jul. 19, 2002

(65) Prior Publication Data

US 2004/0015666 A1      Jan. 22, 2004

(51) Int. Cl.
    G06F 12/00           (2006.01)
(52) U.S. Cl. ...................................... 711/154
(58) Field of Classification Search .................. 714/42; 710/52; 370/471; 711/154
    See application file for complete search history.

(56) References Cited

U.S. PATENT DOCUMENTS

| | | | | |
|---|---|---|---|---|
| 6,584,584 B1* | 6/2003 | Smith | ........................... | 714/42 |
| 6,792,484 B1* | 9/2004 | Hook | ........................... | 710/52 |
| 2002/0138674 A1* | 9/2002 | Mann | ........................... | 710/52 |
| 2003/0112798 A1* | 6/2003 | Ziegler et al. | ............... | 370/366 |
| 2003/0217215 A1* | 11/2003 | Taborek et al. | ............. | 710/305 |
| 2004/0004975 A1* | 1/2004 | Shin et al. | ................... | 370/471 |

* cited by examiner

Primary Examiner—Mano Padmanabhan
Assistant Examiner—Duc T Doan (57) ABSTRACT

A method and apparatus for operating a memory is presented. Information is stored in the memory based on a first time domain and information is read from the memory based on a second time domain. A cooperative relationship is maintained between a write pointer which points to memory locations, where data will be stored and a read pointer which points to memory locations, from which data will be read. A FIFO memory is presented which has memory locations and a register array is presented which stores a bit array that has bit locations. Each bit location in the bit array corresponds to a memory location in the memory. As the write pointer points to a memory location and data is stored in the memory location, a bit (e.g. flag) is set in the bit array. The Flag designates whether the data stored in the memory location is available for reading. Prior to reading information from the memory location, a test is made of the bit location that corresponds to the memory location. The bit value denotes whether the data stored in the memory location is valid data and available for reading.

13 Claims, 4 Drawing Sheets

METHOD AND APPARATUS FOR ASYNCHRONOUS READ CONTROL

BACKGROUND OF THE INVENTION

1. Field of the Invention

The present invention relates to memories.

2. Description of the Related Art

Conventional communication systems include transmitters and receivers. In synchronous communication systems the transmitter and receiver are based on the same clock or timing information. Therefore, transmitted data is received with the proper timing constraints. In asynchronous communications the transmitter and receiver are based on different clocks. Therefore, the transmitter and receiver may have different time domains. As a result, there is a need to queue or resynchronize communicated data. The queuing or resynchronization of data is often accomplished with a memory. For example First-in, First-out (FIFO) memories are often used for this purpose.

A FIFO memory is a memory that processes data in the order that the data is received by the memory. In other words, data that is received first, is processed first. In a conventional FIFO memory data is written into a memory space based on a first clock and read out of the memory space based on a second clock. The writing and reading may be synchronized (e.g. synchronous communications) or unsynchronized (e.g. asynchronous communications).

An asynchronous FIFO memory includes a write counter and a read counter. The write counter is incremented each time information is written into the memory space. The read counter is incremented each time that information is read out of the memory space. The write counter and the read counter control a write pointer and a read pointer, respectively. The write pointer and the read pointer identify the location in the memory space that the data will be written to or read from. In an asynchronous FIFO, the write counter and write pointer are dependent on the transmitter time domain and the read counter and read pointer are dependent on the receiver time domain.

In conventional communication systems, techniques are implemented to ensure that the write pointer and read pointer maintain a cooperative relationship. For example, it is important that the write pointer does not point to a memory location that has not been read. It is equally important that the read pointer does not point to a memory location that has already been read from. In addition, there are a number of other scenarios that may develop if the write pointer and the read pointer are not operating in a coordinated manner.

To maintain the cooperative relationship a number of techniques have been developed. For example, forced spacing between the write pointer and the read pointer may be implemented. This would ensure that the two pointers are not writing or reading in an uncoordinated manner. Different testing algorithms may be implemented to make sure that the spaces being written into and the spaces being read from, are written into and read from, at the right time.

In addition, to complicate matters, conventional memories are made from memory storage elements such as flip-flops. Most memory storage elements take time to store data. Typically, there is time before data storage, known as the setup time and a time after the data storage, known as the hold time. If there are changes in the data input to a storage device between the setup and hold time, the data stored in the memory element is defined as unstable and as a result is unreliable. Therefore, in a FIFO memory, accommodations have to be made for the setup and hold times of the memory elements. The accommodations are typically made by establishing spacing between the write pointer and read pointer or by developing an algorithm, which ensures the coordinated operation of the write pointer and the read pointer.

Approaches for ensuring the coordinated operation of the write pointer and read pointer include methods that are implemented in the FIFO architecture and methods that are implemented in the communication systems. For example, in the FIFO architecture, one method for ensuring the coordinated operation of the write pointer and the read pointer, involves comparing the two counters associated with the two pointers, to ensure that the two pointers are appropriately spaced relative to each other. However, comparing two counters that are clocked asynchronously can lead to unreliable decoding if either or both counters change multiple bits simultaneously. Incrementing both counters according to a Gray counting sequence avoids this problem. In a Gray counting sequence only one bit in the write or read counter will change with each count. As a result, the problem of counters changing multiple bits simultaneously is avoided.

A number of methods may be implemented in a communication system to maintain coordinated operation of the write pointer and the read pointer. For example, spacing or symbols may be placed between data packets when a transmitter sends packets. The spacing between packets provides space between the data packets arriving at a memory and as a result, the read pointer has an opportunity to advance so that there is no overlap between the data that is written into the memory and the data that is read out of the memory. In addition, special symbols may be placed within the data stream. The symbols have the effect of increasing or decreasing the spacing between pointers so that the pointers continue to work in a coordinated manner.

Although some of these methods and techniques are applicable to individual communications links, a number of the newer communication systems include several communications links, each communicating information in parallel. In many of the newer communication systems, data is communicated by striping the data across each link and consolidating the data in a receiver.

Thus there is a need to coordinate the reading and writing of data from a memory, when reading is done on one time domain and writing is done on a second, different time domain. There is a need for coordination techniques that enable multiple links to synchronize data in a receiver.

SUMMARY OF THE INVENTION

The present invention is directed to a method of operating a FIFO memory. As information is received in a receiver, data is written into the memory based on a transmitter clock. Information is then stored in the memory and read from the memory based on a receiver clock. Pointers are used to designate the location in the memory that the information should be written to and read from. In the method of the present invention, a bit array is stored in a register array. Each bit in the bit array corresponds to a memory location in the memory. Bits are set in the register array and denote whether the memory location corresponding to the bit, has valid information that can be read or is available to store information.

In one embodiment of the present invention, multiple paths are established between a transmitter and receiver. Data is simultaneously transmitted on each path. Furthermore, each path has a FIFO associated with the path and each FIFO has a register array associated with the FIFO. Each FIFO operates independently to receive and store data communicated on the path, which corresponds to the FIFO. Data is then read from the FIFO's in a coordinated manner.

A system comprises a memory including a first memory location, the memory storing data in the first memory location; a register array coupled to the memory, the register array including a second memory location associated with the first memory location, the register array storing bit information in the second memory location, the bit information designating whether the first memory location is storing data that is available for reading; and a read control unit coupled to the memory and coupled to the register array, the read control unit controlling reading of the data from the first memory location in response to testing the bit information stored in the second memory location.

A method of operating a memory comprises the steps of writing data in the memory in response to receiving the data, the memory storing the data; setting a bit in a register array in response to storing the data in the memory; and determining whether to read the data stored in the memory based on the bit stored in the register array.

A method of synchronizing data comprises the steps of writing data in a memory with a first clock, the memory storing the data; setting a bit array in response to the memory storing the data; generating test information by testing the bit array; and reading the data out of the memory with a second clock, in response to the test information, wherein the second clock is different from the first clock.

A method of asynchronous readout comprises the steps of storing data in a memory; setting a bit array in response to storing the data in the memory; testing the bit array; and determining whether to read the data in response to testing the bit array.

A method of synchronizing data comprises the steps of defining a memory space, the memory space including a memory location; defining an array, the array including a bit location corresponding to the memory location; pointing to the memory location with a write pointer; storing data in the memory location in response to pointing to the memory location; setting the bit location corresponding to the memory location in response to storing the data in the memory location; pointing to the memory location, with a read pointer; testing the bit location corresponding to the memory location in response to pointing to the memory location with a read pointer; and determining whether to read the data out of the memory location in response to testing the bit location corresponding to the memory location.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

A method and apparatus is presented, which may be implemented in a communication system including one link or multiple links. A number of communication protocols have developed to facilitate transmission of information across disparate devices. Although the method and apparatus may be discussed with respect to several sample protocols, it should be appreciated that the methodology may be applied to any communication system with a transmitter and receiver. Further it should be appreciated that the method and apparatus may be applied to any system that includes a memory such as a communication or computing system that includes a FIFO memory.

A communications architecture including a transmitter and receiver may include an architecture where the transmitter and receiver are directly connected or an architecture where the transmitter and receiver communicate across a network. Further, a communication architecture may include a system where the transmitter and receiver are collocated in the same unit with the transmitter residing on one interface of the unit and the receiver residing on another interface in the unit. As such, communication between the two interfaces may be accomplished through a switching network or across the backplane in the unit. Lastly, a communication architecture may include a system where both the transmitter and receiver are located on the same interface and communicate information across a bus implemented in the interface.

In one embodiment of the present invention, the method and apparatus may be implemented with a protocol that is compliant with the Open System Interconnection model (OSI); such as communication systems that are compliant with the Infiniband architecture (IBA). The OSI model defines a number of communications layers such as an end-user layer, a session layer, a transport layer, a network layer and a physical layer. Each layer defines system functionality. Communication and computer equipment manufacturers may develop technology that is compliant with the OSI architecture so that their products will network with products developed by other manufacturers. It should be appreciated that the teachings of the present invention is applicable to any communication or computer equipment that is compliant with the OSI architecture.

The IBA facilitates the connection of multiple independent processor platforms. The IBA defines a communication and management infrastructure, which supports both input and output as well as inter-process communication between computer and communication systems. The devices in the IBA are classified as switches, routers, channel adapters, repeaters, links that interconnect switches, routers, repeaters, and channel adapters.

The IBA is one of many communications related protocols that is compliant with the open systems interconnection architecture. These architectures including the IBA include upper-level services, which include end-user or consumer functionality and lower level services with include transport layer functionality, network layer functionality, link layer functionality and physical layer functionality. Upper-level services are performed in end-user devices and lower-level services such as the transport layer, network layer and physically layer services, may be implemented in network communications devices.

In the IBA architecture links interconnect channel adapters, switches, and repeaters to form a fabric. Channel adapters are the IBA devices that are located in processor nodes and consume packets. Switches receive packets and pass them along to a destination address identified in the packets. Routers route packets through the network by receiving packets, replacing the packets headers and then forwarding the packets to the next destination in the communications path.

Many communication systems and protocols allow for the communication of data on several simultaneous paths at the same time. As a result, data may be byte striped across these communications paths. The present invention may be implemented with communications systems that include a single channel (e.g. link) or with communications systems that include multiple channels (e.g. links).

The IBA architecture provides for three alternatives depending of whether the communications link is implemented electrically or optically. For example, the IBA architecture defines a 1× path, a 4× path and a 12× path. In the 1× path implemented with electrical technology, two differential pairs of wires are used, 2 per direction for a total of 4 wires. In the optical implementation 1 transmit path and one receive path is implemented for a total of 2 fibers. In the 4× path implemented with electrical technology, eight differential pairs of wires are used, four per direction, for a total of 16 wires. In the optical implementation, four transmit fibers and four receive fibers are used for a total of eight fibers. In the 12× path implemented with electrical technology, 24 differential pairs of wires are used, 12 per direction, for a total of 48 wires. In the optical implementation 12 transmit fibers and 12 receive fibers are used for a total of 24 fibers. While the foregoing configurations detail specific embodiments of the present invention, in an IBA architecture it should be appreciated that the method and apparatus may be implemented in an IBA architecture configured with single or multiple paths, other than the foregoing configurations. Further, it should be appreciated that the method and apparatus of the present invention may be implemented in any communications architecture including multiple paths.

In a communication system implemented in accordance with the teachings of the present invention a serial bit-stream may be used to communicate between a transmitter and receiver. The serial bit-stream may be communicated across one communication path or striped across multiple communications paths. For example, in the IBA a serial bit-stream may be communicated across a transmitter receiver pair configured in a 1× configuration, a 4× configuration or a 12× configuration.

Several paths may be established between a transmitter and receiver and data may be striped across the individual paths. When data is striped across a path whether it is IBA compliant or non-IBA compliant, each byte is communicated on each individual path and then the collective byte's are recombined in a receiver. For example byte 1 would be placed on path 1, byte 2 would be communicated on path 2, byte three would be communicated on path 3 and byte four would be communicated on path 4.

The data that is received on a single communication link or striped across the various communications paths is subsequently stored in a memory in the receiver. The receiver memory is typically a FIFO receiver memory. The receiver memory receives and writes the data into the FIFO memory with the clock of the transmitting device and reads the data out of the FIFO memory with the clock of the receiving device. As a result, there are two time domains, a transmitting device time domain and a receiving device time domain. The FIFO implemented in accordance with the teachings of the present invention compensates for any differences in the two time domains.

In an elastic FIFO, data is written into the memory using a transmitter clock and data is read from the memory using a receiver clock. The data may be written into the memory at one rate and the data may be read from the memory at a second, different rate. The writing and reading of data in an elastic FIFO is dynamic and continuous. In addition, as a result, pointers associated with the writing and the reading of the elastic FIFO may adjust dynamically.

One method of compensating for the difference in time domains is by creating inter-gap spacing in the serial bit-stream. The inter-gap spacing facilitates the spacing between pointers (e.g. write pointer and read pointer), which point to memory locations where information will be stored and pointers which point to memory locations from which information will be read. In the IBA architecture the interconnected gaps are implemented using skip ordered sets. Skip ordered sets include a control symbol known as the skip symbol or skip character. The skip symbol is transmitted in the data stream and read by the receiver. As a result, spacing may be increased between the read and write pointers, decreased between the read and write pointers, maintained between the read and write pointers or adjusted and dynamically changed. For example, when the FIFO receives the skip character the FIFO may allow the write counter to continue to increase. Since the write pointer advances with each increment of the write counter, the write pointer will sequentially advance to different locations in the memory, while the read pointer is static. The advancement of the write pointer, while the read pointer remains static, results in spacing between the write pointer and the read pointer. It should be appreciated that while pointer spacing is discussed with respect to skip ordered sets, any symbols or pointer management technique may be used and still remain within the scope of the present invention.

In one embodiment of the present invention, a write pointer points to a location in a memory space where information may be written. The memory then stores the information. The read pointer, points to a memory location from which information may be read. Both the write pointer and the read pointer move sequentially through the memory space, pointing to locations that should be written to and read from. The write pointer moves based on a transmitter clock and the read pointer moves based on a receiver clock. The write pointer is controlled by a write control unit and the read pointer is controlled by a read control unit. The write control unit operates based on the transmitter clock and the read control unit operates based on the receiver clock.

The write control unit and the read control unit communicate with a register array (e.g. valid bit array). The register array includes a memory location that corresponds to each memory location in the memory space. A bit array is stored in the register array. Each bit (e.g. flag) in the bit array corresponds to a memory location in the memory space. As a result, setting a bit (e.g. flag) in the bit array communicates information about the status of the data stored in the memory space.

During operation, the write control unit communicates write pointer location information (e.g. the location in the memory that the write pointer is pointing to) to the register array storing the bit array (e.g. referred to as the valid bit array). As a result, the bit locations in the bit array may be set to reflect whether a memory location has data, which is available for reading. Typically the bit corresponding to the memory location will be set after the data is stored in the memory location and is valid. For example, the corresponding bit, in the bit array, may be set after the data has exceeded the set up and hold time for the memory, where set up and hold time is a time period required to ensure that the memory is storing stable data.

In addition, the register array storing the bit array communicates information (e.g. the bit array) to the read control unit. As a result, the read control unit is able to control the reading of data from the memory and the advancement of the read pointer. The read control unit tests the value of a bit in the bit array, and determines whether the data in the memory location corresponding to the bit is valid and ready for reading. For example, if the bit array is 16 bits long, the read control unit may test bit three to determine if the data stored in the memory location corresponding to bit three, is valid and ready for reading. To test bit three the read control unit would determine which logical state identifies valid data. For example, a logical 1 may identify valid data. If a logical 1 identifies valid data, the read control unit would test bit three to determine if bit three is a logical 1. If bit three is a logical 1 then, the data stored in the memory corresponding to bit three, is valid and reading for reading. If bit three is a logical 0, then the data stored in the memory corresponding to bit three, is invalid data and may not be read. As a result, the read control unit would wait and test again later.

The tables given below illustrate the method of the present invention in tabular form. Table 1 given below provides a conceptual view of a FIFO. The first row of information in Table 1 is used to represent memory locations numbered (1) through (16) in a FIFO memory.

The memory locations correspond to a FIFO that is 16 memory locations deep. The second row represents a data row and is shown below the row for the memory locations. The data row corresponds to the data that is stored in the associated memory location. For example, the "U" symbol corresponds to undefined data. A valid bit row is shown below the data row. The valid bit row corresponds to a 16-bit register array that stores a valid bit flag. The valid bit flag represents whether the data stored in the memory location is valid or not. Rows are also provided for the read pointer and the write pointer. In the Table, the memory location, the data, the valid bit, the read pointer and the write pointer in a column are associated with each other. In addition, the combination of rows and columns provide a tabular representation of the operation of a FIFO, such as an elastic FIFO.

As shown in Table 1, the placement of the "R" and the "W" in the same column as memory location (1), represents that the read and the write pointers are currently pointing at memory location (1). In addition, the "U" placed in the columns associated with memory locations (1) through (16) denotes that the data in memory locations (1) through (16) is undefined. Data may be undefined because the memory is within the set up and hold time, because the FIFO is resetting just after a system reset or for another reason. In Table I the valid bit flag for each memory location is set to a logical 0. The valid bit flag is set to a logical 0 right after reset because no information has been written into the memory. It should be appreciated, that while the convention presented in the current discussion, starts with the valid bit flag set at logical 0; as will become apparent from the discussion below, the valid bit flag may be set at logical 1 and still remain within the teachings of the present invention.

In Table 2 given below, the write pointer has advanced two memory locations and is positioned at memory location (3). As the write pointer advances to memory location (3) data is written and stored in memory location (1), memory location (2) and memory location (3).

TABLE I

| Memory Location | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Data | U | U | U | U | U | U | U | U | U | U | U | U | U | U | U | U |
| Valid bit | 0 | 0 | 0 | 0 | 0 | 0 | 0 | 0 | 0 | 0 | 0 | 0 | 0 | 0 | 0 | 0 |
| Read Pointer | R | | | | | | | | | | | | | | | |
| Write Pointer | W | | | | | | | | | | | | | | | |

TABLE II

| Memory Location | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Data | A | B | C | U | U | U | U | U | U | U | U | U | U | U | U | U |
| Valid bit | 1 | 1 | 1 | 0 | 0 | 0 | 0 | 0 | 0 | 0 | 0 | 0 | 0 | 0 | 0 | 0 |
| Read Pointer | R | | | | | | | | | | | | | | | |
| Write Pointer | | | | W | | | | | | | | | | | | |

As the data is written and stored in the various memory locations, the valid bit is changed from a logical 0 to a logical 1 as shown in the valid bit row. Therefore when the write pointer points to memory location (1) and data shown as "A" is stored in memory location (1), the corresponding valid bit flag which is stored in a valid bit register array is changed to a logical 1. When the write pointer points at memory location (2) and data denoted as "B" is stored in memory location (2) the valid bit associated with memory location (2) is changed from a logical 0 to a logical 1. Lastly when the write pointer points at memory location (3) and the data denoted as "C" is stored in memory location (3) the valid bit flag associated with memory location (3) is changed from a logical 0 to a logical 1.

It should be noted that since the write pointer has only reached memory location (3), the data in memory locations (4) through (16) still remain undefined, because the write pointer has not reached those locations at this stage in the process. In addition the valid bit flags for memory locations (4) through (16) still have a value of logical 0, since the write pointer has not written information into those memory locations and the memory has not stored new information that is available for reading.

The method of the present invention continues with Table III given below.

In Table III the write pointer has sequentially advanced to memory location (16) and information has been written into and stored in each of the memory locations in the FIFO as the write pointer has advanced. Each of the valid bits associated with memory locations (1) through (16) have changed from logical 0 to logical 1 as the write pointer has advanced to that memory location and information is stored in the memory location. In addition the read pointer has advanced to memory location (13). Information is read from the FIFO memory as the read pointer advances. Therefore data in memory locations (1) through (13) have been read from the FIFO memory. It should be noted that in the method and apparatus of the present invention a distance of at least two memory locations should be maintained between the read pointer and the write pointer. As shown in Table III, the read pointer is at memory location 13, memory locations (14) and (15) provide spacing; and the write pointer is located at memory location (16).

In the method associated with the present invention, the write pointer wraps around and points at memory location (1) after it has reached the maximum depth of the memory. Therefore in the FIFO memory presented in Table III, as the data comes in from the communications link, the write pointer writes information into 16 memory locations and then wraps around to memory location (1).

In Table IV, the write pointer has already wrapped around and is positioned at memory location (4).

TABLE III

| Memory Location | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Data | A | B | C | D | E | A | D | B | E | E | F | A | B | C | D | E |
| Valid bit | 1 | 1 | 1 | 1 | 1 | 1 | 1 | 1 | 1 | 1 | 1 | 1 | 1 | 1 | 1 | 1 |
| Read Pointer | | | | | | | | | | | | | R | | | |
| Write Pointer | | | | | | | | | | | | | | | | W |

TABLE IV

| Memory Location | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Data | X | X | X | D | E | A | D | B | E | E | F | A | B | C | D | E |
| Valid bit | 0 | 0 | 0 | 1 | 1 | 1 | 1 | 1 | 1 | 1 | 1 | 1 | 1 | 1 | 1 | 1 |
| Read Pointer | | | | | | | | | | | | | | | | R |
| Write Pointer | | | | W | | | | | | | | | | | | |

The write pointer has written new data into memory locations (1), (2), (3) and is positioned to write information into memory location (4). In addition it should be noted that since the write pointer has wrapped around, each memory location that has stored new data, has been changed as shown by data denoted as "X" in memory location (1), data denoted as "X" in memory location (2) and data denoted as "X" in memory location (3). A change in the valid bit is also shown in memory location (1), memory location (2), and memory location (3). The valid bit associated with memory location (1), memory location (2), and memory location (3), functions as a flag and designates that these memory locations have been written into and have new data which has been stored and is available for reading.

Memory locations (4) through (16) show valid bits as logical 1. In the method of the present invention, when information is written, stored in the memory and available for reading, the valid bit flag is changed. Therefore, on a second pass through the FIFO memory the valid bit flag would be changed from the previous value to a new value. For example, since the valid bit flag was previously changed from logical 0 to logical 1 on the first pass through the FIFO, during the second pass through the FIFO, the valid bit flag will be changed from a logical 1 to a logical 0. As a result, since Table IV shows the write pointer sequentially making a second pass through the FIFO, memory locations (1) through (3) have valid bits denoted as 0 and memory locations (4) through (16) have valid bits denoted as 1.

At this point in the process the write pointer has sequentially made an initial pass through the FIFO memory and is on the second pass through the FIFO memory. The write pointer has pointed to locations (1) through (3) and the FIFO has stored data denoted as "X" in memory locations (1), (2) and (3). Since the data has been written and stored in memory locations (1), (2) and (3) the valid bit flags associated with these memory locations have been changed from logical 1 to a logical 0.

In Table IV, the read pointer has moved sequentially through memory locations (1) to (16) and is now positioned and located at memory location (16). Therefore, memory locations (1) to (15) in the FIFO have already been read from, on the first pass through the FIFO and the read pointer will point to memory location (16) on the next clock cycle. It should be noted that in one embodiment of the present invention, the valid bit flag changes when the write pointer points to the memory location, information is stored in the memory location, and the set up and hold time for the memory has elapsed. However, changing the valid bit flag on the reading of the data is also within the scope of the presenting invention. Since the FIFO has a depth of 16 memory locations and the read pointer is positioned at memory location (16), the read pointer will wrap around to memory location (1) on the next clock cycle and begin to read data in memory location (1).

In Table V given below, both the write pointer and the read pointer have now wrapped around and are sequentially moving through the FIFO.

TABLE V

| Memory Location | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Data | X | X | X | Y | Y | Z | Z | Z | Q | Q | F | A | B | C | D | E |
| Valid bit | 0 | 0 | 0 | 0 | 0 | 0 | 0 | 0 | 0 | 0 | 1 | 1 | 1 | 1 | 1 | 1 |
| Read Pointer | | | | | | | R | | | | | | | | | |
| Write Pointer | | | | | | | | | | W | | | | | | |

As shown in Table V, the write pointer has now moved to memory location (10). As the write pointer moves through the FIFO, each of the valid bits are changed from a logical 1 to a logical 0. As shown in Table V, the write pointer has only reached memory location (10), as a result, memory locations (11) through (16) still have a valid bit of logical 1, which was stored in the valid bit register array from the last pass of the write pointer through the FIFO. The write pointer will continue to increase sequentially through the memory locations and as the write pointer points to memory locations and information is stored in the new memory locations, the valid bit flag will be changed from a logical 1 to a logical 0.

During the current pass of the write and read pointers through the FIFO, the valid data is designated by a valid bit flag that is set to a logical 0. As the read pointer arrives at a new memory location, for example memory location (7), the FIFO logic computes that the data stored in memory location (7) is valid data before the valid bit flag is set to logical 0. In Table V, the write pointer points to memory location (10) and information has already been written and correctly stored in memory location (10). This is denoted by the fact that the valid bit flag associated with memory location (10) has already been reset to logical 0 from its previous state of logical 1. It should be noted once again that the write pointer and the read pointer are spaced two memory locations apart. For example the read pointer is at memory location (7) and the write pointer is at memory location (10). Memory locations (8) and (9), provide a two memory location spacing. It should also be appreciated that a spacing of more than two memory locations or less than two memory locations or in the alternative and algorithm that varies the distance between pointers would still remain within the scope of the present invention.

In Table VI the write pointer has reached the edge of the FIFO and the read pointer is now positioned two memory locations before the write pointer and three memory locations before the end of the FIFO.

TABLE VI

| Memory Location | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Data | X | X | X | Y | Y | Y | Z | Z | Z | Q | Q | Q | X | X | X | Y |
| Valid bit | 0 | 0 | 0 | 0 | 0 | 0 | 0 | 0 | 0 | 0 | 0 | 0 | 0 | 0 | 0 | 0 |
| Read Pointer | | | | | | | | | | | | | R | | | |
| Write Pointer | | | | | | | | | | | | | | | | W |

For example, the write pointer is positioned at memory location (16), data denoted as "Y" is stored in memory location (16) and the valid bit flag associated with memory location (1) has changed from a logical 1 to a logical 0. The read pointer is positioned at memory location 13. Data denoted as "X" is stored in memory location (13).

As stated earlier, spacing of two memory locations is provided between the write pointer and the read pointer. It should be noted that since the write pointer has reached the end of the FIFO memory the write pointer is going to wrap around and point at memory location (16). In addition at some time after the write pointer has wrapped around, the read pointer will also wrap around and point at memory location (1). Since the write pointer has reached the end of the FIFO memory each valid bit flag has been set to a logical 0. Therefore on the next pass through the FIFO memory, a change from a logical 0 to a logical 1 will denote that data is ready for reading. When the read pointer wraps around, the logic associated with the method of the present invention will look for a valid bit that has a logical value of 1 before the data associated with the valid bit flag is read from memory.

In Table VII given below, both the write pointer and the read pointer have wrapped around. Therefore both pointers are going to make another pass through the FIFO memory.

TABLE VII

| Memory Location | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Data | B | E | E | F | Y | Y | Z | Z | Z | Q | Q | Q | X | X | X | Y |
| Valid bit | 1 | 1 | 1 | 1 | 0 | 0 | 0 | 0 | 0 | 0 | 0 | 0 | 0 | 0 | 0 | 0 |
| Read Pointer | R | | | | | | | | | | | | | | | |
| Write Pointer | | | | W | | | | | | | | | | | | |

The new pass through the FIFO memory will include the write pointer pointing to each memory location in sequence, data being stored in those memory locations and then the valid bit flag associated with each of the memory locations being set. The read pointer will then sequentially advance to each of the memory locations testing the valid bit flag associated with each of the memory locations. Based on the state of the valid bit flag, a determination will be made of whether the data in the memory location can be read or not. For example on the current pass through the FIFO memory, data denoted as "B" is stored in memory location (1), data denoted as "E" is stored in memory location (2), data denoted as "E" is stored in memory location (3) and data denoted as "F" is stored in memory location (4). Since the valid bit flag associated with memory locations (1), (2), (3) and (4) have already been set to logical 1, the data in each of these memory locations has already been stored as shown by the valid bit flag associated with each of these memory locations. Since the write pointer has not reached memory locations (5) through (16) it should be noted that each of these memory locations still has a valid bit flag set to logical 0. Consistent with the method and apparatus of the present invention the write pointer and the read pointer have a spacing of two memory locations.

Figure 1:
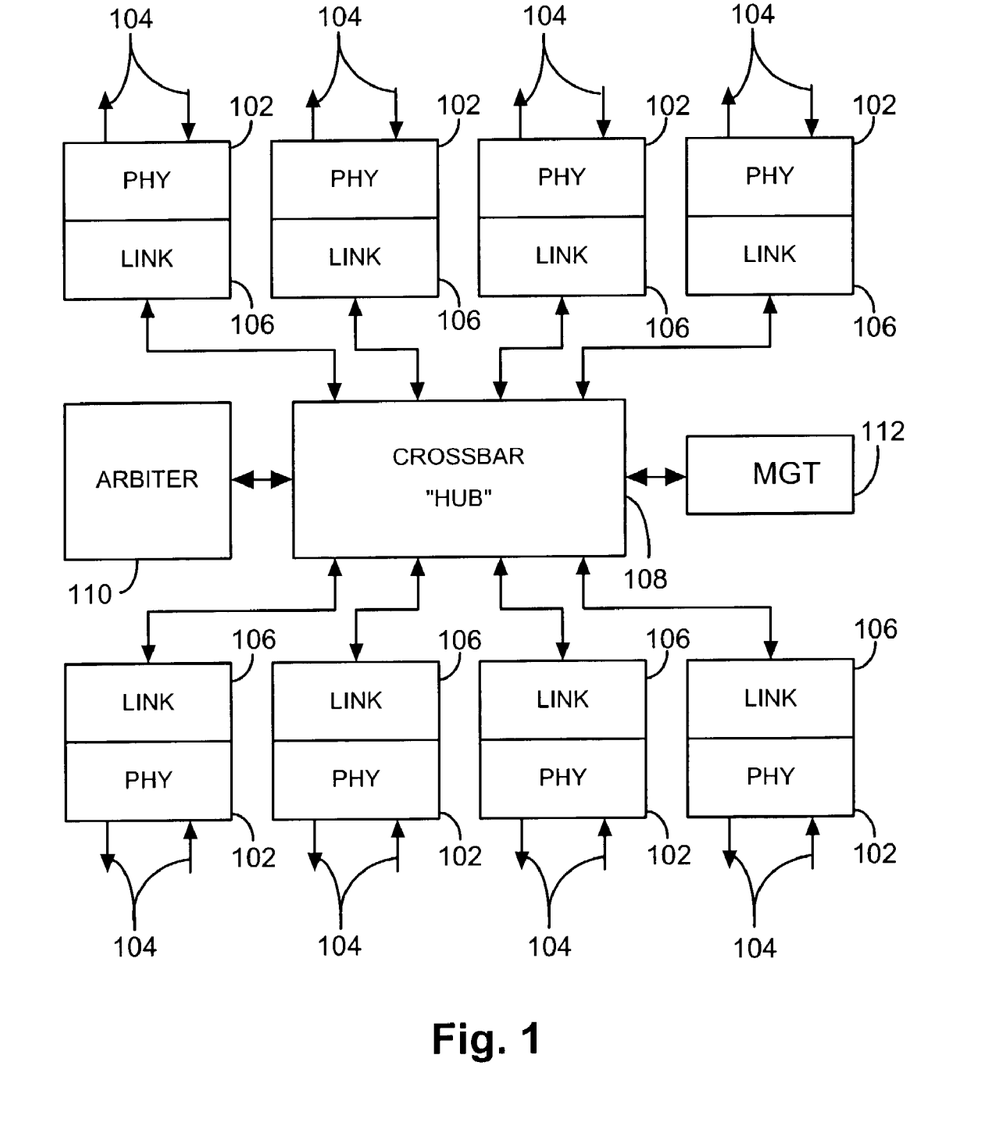
FIG. 1 is a switch implementation of the present invention.

The method and apparatus of the present invention may be implemented in a number of communications devices and interfaces that are compliant with a number of OSI compliant protocols. For example, in FIG. 1 the method and apparatus of the present invention is implemented in an IBA compliant switch. The switch includes both transmitting functions and receiving functions. In FIG. 1 a physical layer block 102 is shown. The physical layer block 102 provides physical layer processing and management such as media control and signaling. For example, in the present embodiment, each physical layer block 102, may be configured for 1×, 4× or 12× communications as shown by 104. In the 1× configuration, one communications path is established from transmitter to receiver. In a 4× or 12× configuration, multiple communications paths are established from transmitter to receiver. In addition, data is striped across the communications paths and consolidated in the receiver.

The physical layer block 102 interfaces with a link layer 106. The link layer 106 in conjunction with the physical layer 104 includes most of the logic and functionality of the present invention (e.g. a FIFO memory and associated logic). The link layer 106 connects to a crossbar switch 108, which switches incoming and outgoing traffic. The crossbar switch 108 is managed by a management block 112, which performs management functions and system test. An arbiter 110 is connected to the crossbar switch 108. The Arbiter 110 grants and denies access across the crossbar 108.

Figure 2:
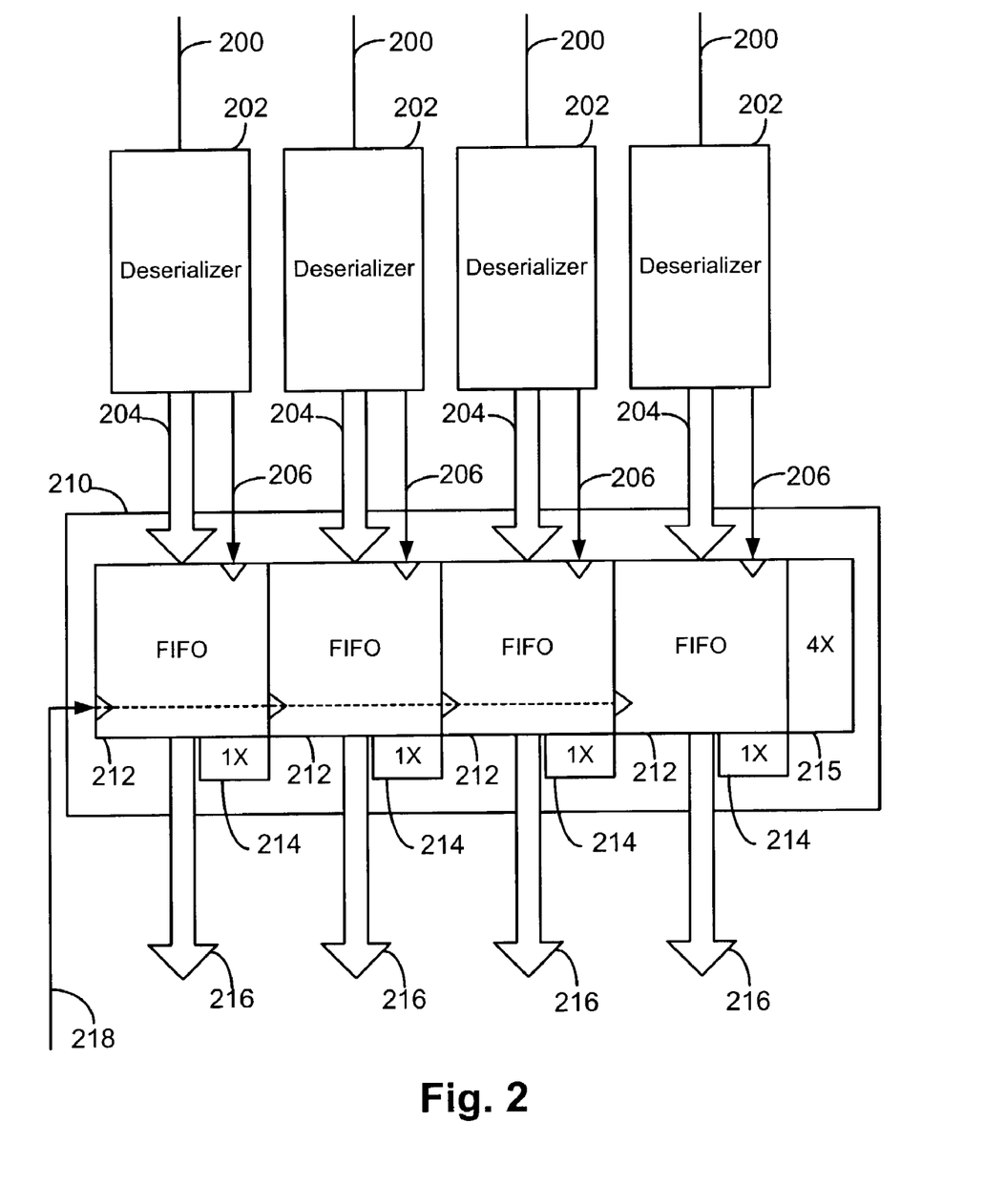
FIG. 2 is an internal view of a link layer shown in FIG. 1.

An internal view of portions of the link layer 106 of FIG. 1 and the physical layer 102 of FIG. 1, is shown in FIG. 2.

In FIG. 2, an incoming serial bit-stream is shown as 200. A de-serializer 202 takes the incoming serial bit-stream 200 and turns it into a parallel bit-stream 204. The parallel bit-stream 204 is communicated from the de-serializer 202 to a block memory 210. The parallel bit-stream 204 and a clock signal 206 are input into individual FIFO memories 212. The individual FIFO memories 212 are each associated with an individual communication path such as the 1× configuration in an IBA architecture. The block memory 210, which houses individual FIFOs 212, supports four communications paths 204. In one embodiment of the present invention, logical control of the individual FIFO's 212, may be implemented with a state machine shown as 214. Logical control of the system operating in 4× mode may be implemented with a state machine shown as 215.

An incoming clock signal 206 is also recovered from the incoming serial bit-stream 200. The individual FIFO memories 212 receive the incoming data and incoming clock and resynchronize the data according to a receiver system clock. The receiver system clock signal is input into the individual FIFOs as shown by 218. Resynchronized data is then produced as shown by 216 and processed within the switch.

Figure 3:
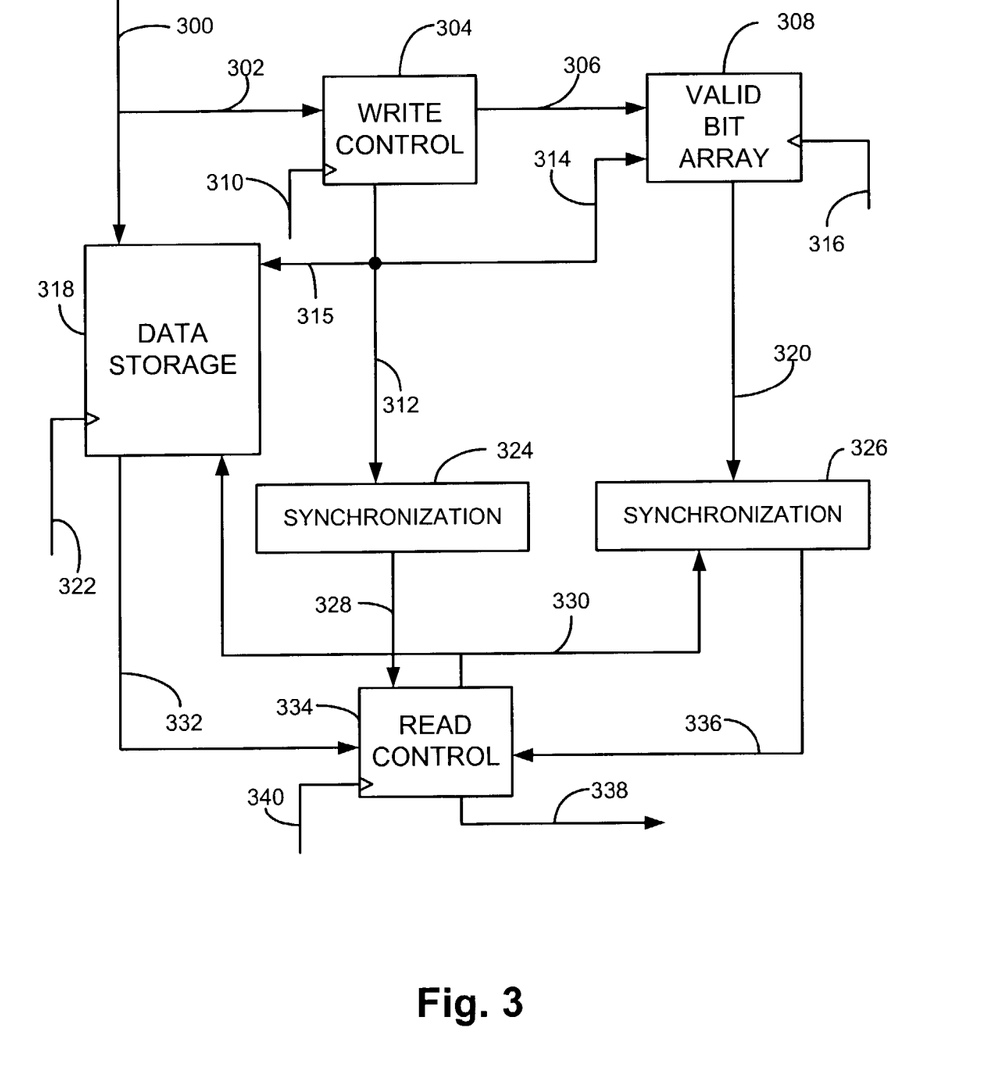
FIG. 3 is an internal view of the memory shown in FIG. 2.

An internal view of a portion of an individual FIFO buffer 212 of FIG. 2 is shown in FIG. 3. In FIG. 3 a data storage unit is shown as 318. Write control units and read control units are shown as 304 and 334 respectively. A valid bit register array is shown as 308. Lastly, synchronization units are shown as 324 and 326.

During the operation of the FIFO buffer shown in FIG. 3, data 300 from a de-serializer enters the memory. The data 300 is input into a data storage unit shown as 318 and into a write control unit 304. Data is stored in the data storage unit 318. The data storage unit 318 is controlled by a transmitter clock shown as 322. The data 300 is also analyzed by the write control unit 304. The write control unit 304 controls the write control pointer. The write control unit 304 analyzes the data 302 to determine how to control the write pointers. For example, in one embodiment of the present invention, the write control unit 304 starts to advance the write control pointer when special symbols are received on data input 302. In addition, the write control unit is controlled by the transmitter clock 310. Information on the memory location that the write pointer is pointing to is communicated to the valid bit array 308, as shown by 306. As such the valid bit array 308 is able to track the movement of the write pointer as it advances sequentially through the data storage unit 318. The valid bit array 308 is under control of the transmitter clock as shown by 316.

The write control unit 304 distributes write pointer information to the data storage unit (e.g. 318) as shown by 315, to the valid bit array (e.g. 308) as shown by 314 and to the synchronization unit (e.g. 324) as shown by 312. Once all 16 bits are synchronized the valid bit array 308 outputs all 16 bits to synchronization unit 326, as shown by 320.

The read control unit 334 operates based on the receiver clock as shown by 340. The read control unit 334 provides read pointer information 330 to the data storage unit 318 and to the synchronization unit 326. The read control unit 334 receives data output information 332 from the data storage unit 318. In addition, the read control unit 334 receives synchronized write pointer information 328 from the synchronization unit 324. The read control unit 334 outputs synchronized data 338.

Figure 4:
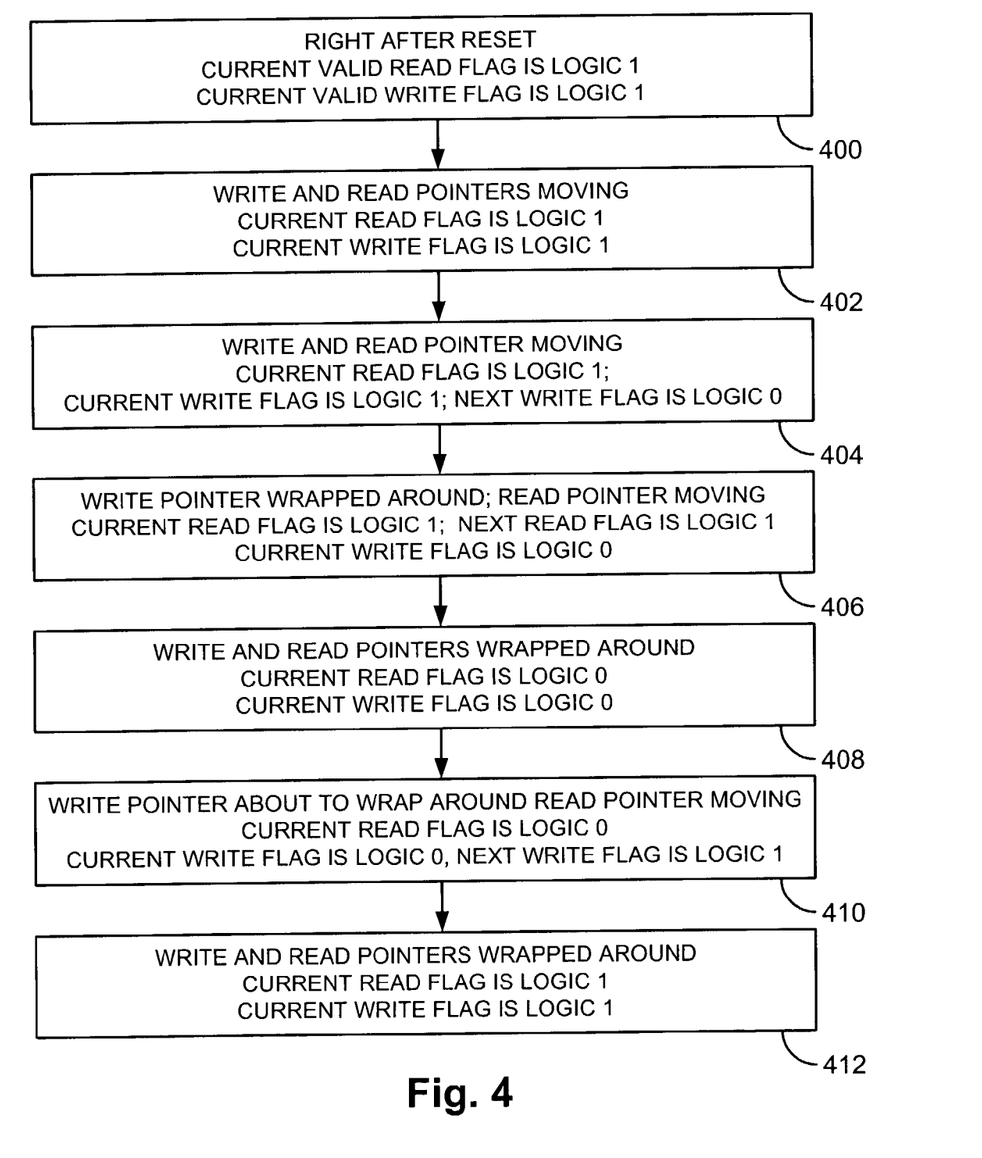
FIG. 4 is a flow chart implementing the method of the present invention.

FIG. 4 displays a flow chart implementing the method of the present invention. As information is stored and retrieved from the FIFO buffer the steps of FIG. 4 are performed. At item 400, right after a reset of a receiver system, such as the switch of FIG. 1, the read and write pointers are located at the first memory location of the FIFO and the current valid read flag is set to logic 1 and the current write flag is set to logic 1. The valid read/write flag is a flag that denotes a memory location where valid information may be written to or read from.

At step 402, the write and read pointers are moving through the FIFO memory. The current valid read flag is set to a logical 1 and the current valid write flag is set to a logical 1. Both pointers are advancing sequentially through the FIFO memory. The write pointer points to a memory location and data is then stored in the memory location. When the read pointer points at a memory location, a test is made of the flag associated with the memory. If the flag is a logical 1, the data in the memory location is valid and may be read.

At step 404, both the write and read pointers are moving sequentially through the FIFO memory. At step 404, the write pointer has reached the end of the FIFO and is about to wrap around to the beginning of the FIFO. The current valid read flag is set to a logical 1, the current valid write flag is set to a logical 1 and the next valid write flag is set to a logical 0.

At step 406, the write pointer has wrapped around and the read pointer is still on its first pass through the FIFO. The read pointer at this step, has reached the end of the FIFO. With the read pointer at the end of the FIFO, the current valid read flag is set to a logical 1 and the next valid read flag is set at a logical 0. The write pointer is advancing through the FIFO for the second time so the current valid write flag is a logical 0.

At step 408, both the read and write pointers have wrapped around in the FIFO memory. The current valid read flag is logical 0. The current valid write flag is logical 0. Both pointers are now advancing sequentially on their second pass through the FIFO.

At step 410, the write pointer is about to wrap around for the second time and the read pointer is advancing through the FIFO memory. The current read flag is set at a logical 0. The current write flag is set at logical 0 and the next write flag is set at logical 1.

At step 412, the write and the read pointers have both wrapped around for the second time and continue to advance through the FIFO memory. The current valid read flag is set to logical 1 and the current logic write flag is set to logical 1.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:
1. A system comprising:
a link layer and physical layer interface comprising:
a plurality of deserializers each receiving an incoming bit stream including an incoming clock signal associated with the incoming bit stream, the plurality of deserializers generating a plurality of parallel bit streams;
a block memory coupled to each of the plurality of deserializers and receiving the parallel bit streams, the block memory including a plurality of FIFO memories, each of the plurality of FIFO memories associated with at least one of the plurality of deserializers, wherein the bit stream is striped across the plurality of FIFO memories in the parallel bit streams and the incoming bit stream resynchronized to an output clock signal that is different from the incoming clock signal, each of the plurality of FIFO memories further comprising:
a memory, the memory comprising a plurality of memory locations;
at least one validity bit corresponding to each of the plurality of memory locations;
a write pointer designating one of the plurality of memory locations to which next write data should be written, the write pointer advancable to each of the plurality of memory locations in a predetermined order from a first memory location to a last memory location to form a write pass and upon advancement from the last memory location wrapping around to the first memory location to begin a new write pass;

a read pointer designating a second of the plurality of memory locations from which next read data should be read;

a first synchronization unit which receives one of the parallel bit streams synchronized with the incoming clock signal and generates first synchronization information in response to the incoming clock signal;

a write control unit writing which writes data from the one of the parallel bit streams into the memory location designated by the write pointer in response to the one of the parallel bit streams and in response to the first synchronization information, sets the at least one validity bit corresponding to the memory location designated by the write pointer to a write validity value having a current write value to designate that data contained in the corresponding memory location is valid, advances the write pointer to a next one of the plurality of memory locations in the memory according to the predetermined order, and changes the write validity value from the current write value to a new write value only if advancement of the write pointer advances the write pointer from the last memory location to the first memory location, and otherwise retains the current write value for the write validity value;

a read control unit which determines whether the memory location designated by the read pointer is storing data that is available for reading based on the at least one bit corresponding to the memory location designated by the read pointer and a read validity value having a current read value, reads the data stored in the memory location designated by the read pointer to generate an output signal if it is determined that the memory location designated by the read pointer is storing data that is available for reading, advances the read pointer to a next one of the plurality of memory locations in the memory according to the predetermined order, and changes the read validity value from the current read value to a new read value only if advancement of the read pointer advances the read pointer from the last memory location to the first memory location, and otherwise retains the current read value for the read validity value;

a second synchronization unit generating second synchronization information in response to the data read by the read control unit and the output clock signal an output coupled to the block memory and generating an output bit stream in response to the data read by the read control unit resynchronized to the output clock signal.

2. A system as set forth in claim 1, further comprising, a crossbar switch coupled to the link layer and physical layer unit, the crossbar switch performing switching in response to the output bit stream.

3. A system as set forth in claim 2, further comprising a manager that is coupled to the crossbar switch, the manager managing the crossbar switch.

4. A system as set forth in claim 3, further comprising, an arbiter coupled to the crossbar switch, the arbiter granting and denying access to the crossbar switch.

5. A method of synchronizing data comprising the steps of:

receiving an incoming bit stream, the incoming bit stream including an incoming clock signal associated with the incoming bit stream;

generating a plurality of parallel bit streams in response to receiving the incoming bit stream;

generating a striped bit stream by stripping the incoming bit stream across the parallel bit streams;

receiving the striped bit streams in a block memory, the block memory including a plurality of FIFO memories, receiving the striped bit streams and resynchronizing the striped bit stream to an output clock signal that is different from the incoming clock signal, each of the plurality of FIFO memories comprising a plurality of memory locations, at least one validity bit corresponding to each of the plurality of memory locations, a write pointer designating one of the plurality of memory locations to which next write data should be written, the write pointer advancable to each of the plurality of memory locations in a predetermined order from a first memory location to a last memory location to form a write pass and upon advancement from the last memory location wrapping around to the first memory location to begin a new write pass, a read pointer designating a second of the plurality of memory locations from which next read data should be read, each of the FIFO memories further comprising:

generating first synchronization information in response to the incoming clock signal;

writing information in response to the striped bit stream and in response to the first synchronization information into the memory location designated by the write pointer;

setting the at least one validity bit corresponding to the memory location designated by the write pointer to a write validity value having a current write value to designate that data contained in the corresponding memory location is valid;

advancing the write pointer to a next one of the plurality of memory locations in the memory according to the predetermined order; and changing the write validity value from the current write value to a new write value only if advancement of the write pointer advances the write pointer from the last memory location to the first memory location, otherwise retaining the current write value for the write validity value;

generating second synchronization information in response to the output clock signal; and controlling reading of the data from the memory location designated by the read pointer in response to the second synchronization information and in response to determining that the memory location designated by the read pointer is storing data is available for reading based on the at least one bit corresponding to the memory location designated by the read pointer and a read validity value having a current read value;

advancing the read pointer to a next one of the plurality of memory locations in the memory according to the predetermined order in response to reading of the data from the memory location designated by the read pointer; and changing, in response to advancing the read pointer, the read validity value from the current read value to a new read value only if advancement of the read pointer advances the read pointer from the last memory location to the first memory location, and otherwise retaining the current read value for the read validity value; and generating an output bit stream in response to controlling the reading of the data from the first memory location.

6. A method of synchronizing data as set forth in claim 5, further comprising the steps of:
switching the output bit stream in response to generating the output bit stream.

7. A method of synchronizing data as set forth in claim 5, further comprising the steps of:
arbitrating the switching of the output bit stream.

8. A method of operating a memory, the memory comprising a plurality of memory locations, at least one validity bit corresponding to each of the plurality of memory locations, a write pointer designating one of the plurality of memory locations to which next write data should be written, the write pointer advancable to each of the plurality of memory locations in a predetermined order from a first memory location to a last memory location to form a write pass and upon advancement from the last memory location wrapping around to the first memory location to begin a new write pass, a read pointer designating a second of the plurality of memory locations from which next read data should be read, the method comprising:
receiving incoming data synchronized with an incoming clock signal;
writing the incoming data into the memory location designated by the write pointer;
setting the at least one validity bit corresponding to the memory location designated by the write pointer to a write validity value having a current write value to designate that data contained in the corresponding memory location is valid;
advancing the write pointer to a next one of the plurality of memory locations in the memory according to the predetermined order; and
changing the write validity value from the current write value to a new write value only if advancement of the write pointer advances the write pointer from the last memory location to the first memory location, otherwise retaining the current write value for the write validity value.

9. The method of claim 8, further comprising:
determining based on the at least one bit corresponding to the memory location designated by the read pointer and a read validity value having a current read value whether the memory location designated by the read pointer is storing data that is available for reading;
reading the data stored in the memory location designated by the read pointer if it is determined that the memory location designated by the read pointer is storing data that is available for reading;
advancing the read pointer to a next one of the plurality of memory locations in the memory according to the predetermined order; and
changing the read validity value from the current read value to a new read value only if advancement of the read pointer advances the read pointer from the last memory location to the first memory location, otherwise retaining the current read value for the read validity value.

10. The method of claim 9, wherein the step of reading the data stored in the memory location designated by the read pointer is synchronized using a second clock different from the first clock.

11. A system, comprising:
a memory, the memory comprising a plurality of memory locations;
at least one validity bit corresponding to each of the plurality of memory locations;
a write pointer designating one of the plurality of memory locations to which next write data should be written, the write pointer advancable to each of the plurality of memory locations in a predetermined order from a first memory location to a last memory location to form a write pass and upon advancement from the last memory location wrapping around to the first memory location to begin a new write pass;
a read pointer designating a second of the plurality of memory locations from which next read data should be read;
a first synchronization unit which receives incoming data synchronized with an incoming clock and generates first synchronization information in response to the incoming clock;
a write control unit writing which writes the incoming data into the memory location designated by the write pointer in response to the incoming data and in response to the first synchronization information, sets the at least one validity bit corresponding to the memory location designated by the write pointer to a write validity value having a current write value to designate that data contained in the corresponding memory location is valid, advances the write pointer to a next one of the plurality of memory locations in the memory according to the predetermined order, and changes the write validity value from the current write value to a new write value only if advancement of the write pointer advances the write pointer from the last memory location to the first memory location, and otherwise retains the current write value for the write validity value.

12. The system of claim 11, further comprising:
a read control unit which determines whether the memory location designated by the read pointer is storing data that is available for reading based on the at least one bit corresponding to the memory location designated by the read pointer and a read validity value having a current read value, reads the data stored in the memory location designated by the read pointer to generate an output signal if it is determined that the memory location designated by the read pointer is storing data that is available for reading, advances the read pointer to a next one of the plurality of memory locations in the memory according to the predetermined order, and changes the read validity value from the current read value to a new read value only if advancement of the read pointer advances the read pointer from the last memory location to the first memory location, and otherwise retains the current read value for the read validity value.

13. The system of claim 11, further comprising:
a second synchronization unit generating second synchronization information in response to the output signal and a second clock different from the first clock.

* * * * *